(12) United States Patent
Uppunda et al.

(10) Patent No.: US 8,982,901 B2
(45) Date of Patent: Mar. 17, 2015

(54) COUNTER BASED FAIRNESS SCHEDULING FOR QOS QUEUES TO PREVENT STARVATION

(75) Inventors: Vivekananda Uppunda, Karnataka (IN); Chakra Parvathaneni, Sunnyvale, CA (US)

(73) Assignee: Imagination Technologies, Limited, Kings Langley, Hertfordshire (GB)

( * ) Notice: Subject to any disclaimer, the term of this patent is extended or adjusted under 35 U.S.C. 154(b) by 188 days.

(21) Appl. No.: 13/555,151

(22) Filed: Jul. 22, 2012

(65) Prior Publication Data

US 2014/0022902 A1    Jan. 23, 2014

(51) Int. Cl.
*H04J 3/26* (2006.01)
*H04W 28/02* (2009.01)

(52) U.S. Cl.
CPC ................................ *H04W 28/0268* (2013.01)
USPC ......... 370/432; 370/235; 370/395.4; 370/315

(58) Field of Classification Search
CPC combination set(s) only.
See application file for complete search history.

(56) References Cited

U.S. PATENT DOCUMENTS

| | | | |
|---|---|---|---|
| 7,609,649 B1 * | 10/2009 | Bhandari et al. | 370/252 |
| 2004/0092278 A1 * | 5/2004 | Diepstraten et al. | 455/512 |
| 2005/0261004 A1 * | 11/2005 | Dietrich et al. | 455/456.2 |
| 2006/0041917 A1 * | 2/2006 | Vellanki et al. | 725/86 |
| 2007/0195787 A1 * | 8/2007 | Alnuweiri et al. | 370/395.4 |
| 2009/0292575 A1 * | 11/2009 | Ellebracht et al. | 705/8 |
| 2013/0201904 A1 * | 8/2013 | Toskala et al. | 370/315 |

OTHER PUBLICATIONS

MIFI: AQ framework for Fairness and QoS Assurance for Current IEEE 802.11 Networks with Multiple Access Points—IEEE/ACM Transactions on networking. vol. 14, No. 4, Aug. 2006. Yigal Bejerano and Randeep S. Bhatia.*

* cited by examiner

*Primary Examiner* — Ian N Moore
*Assistant Examiner* — Eric H Wang
(74) *Attorney, Agent, or Firm* — Michael S. Garrabrants (57) ABSTRACT

Systems and methods are disclosed to communicate data between wireless access point with one or more low priority queues; one or more high priority queues; a quality of service (QoS) queue coupled to the low and high priority queues; a fairness counter; and a buffer coupled to the fairness counter and the QoS queue to map buffer mapping to the QoS queue when the fairness counter expires, the method including performing an association request for fairness scheduling; and injecting a low priority packet in a transmit opportunity of the high priority queue.

21 Claims, 12 Drawing Sheets

COUNTER BASED FAIRNESS SCHEDULING FOR QOS QUEUES TO PREVENT STARVATION

The present invention relates to wireless communication systems, and specifically to quality of service in packet switched communications.

BACKGROUND

In a communication system, the end-to-end delay of a packet may be defined as the time from its generation at the source to when the packet reaches its destination. In a packet-switched communication system, the delay for packets to travel from source to destination may vary depending upon various operating conditions, including but not limited to, channel conditions and network loading. Channel conditions refer to the quality of the wireless link. Some factors determining the quality of the wireless link are signal strength, speed of a mobile and/or physical obstructions.

In a wireless communication system, each packet may incur a source to destination delay different from that experienced by other packets belonging to the same flow. This variation in delay is known as "jitter." Jitter creates additional complications for receiver-side applications. If the receiver does not correct for jitter, the received message will suffer distortion when the packets are re-assembled. Some systems correct for jitter when reconstructing messages from the received packets. Such systems incorporate a de-jitter buffer, which adds a wait time, referred to as a de-jitter buffer delay. When the de-jitter buffer applies a fixed, large de-jitter buffer delay, it may accommodate a high amount of jitter in arrival of packets; however, this use is not efficient since packets having a smaller delay are also processed using the large de-jitter buffer delay even though these packets could have been processed earlier. This leads to larger end-to-end delays for these packets than what may have been achieved using a smaller de-jitter buffer delay.

The end-to-end delay includes the delays introduced in the network and the various elements through which the packet passes. Many factors contribute to end-to-end delay. Variance in the end-to-end delay is referred to as jitter. Jitter may cause packets to be received after the packets are no longer useful. For example, in a low latency application, such as voice, if a packet is received too late, it may be dropped by the receiver. Such conditions lead to degradation in the quality of communication.

U.S. Pat. No. 7,826,441 discloses an adaptive De-Jitter Buffer for Voice over IP (VoIP) for packet switch communications. The de-jitter buffer methods and apparatus presented avoid playback of underflows while balancing end-to-end delay. In one example, the de-jitter buffer is recalculated at the beginning of each talkspurt. In another example, talkspurt packets are compressed upon receipt of all remaining packets.

In packet-switched systems, data is formed into packets and routed through a network. Each packet is sent to a destination in the network, based on an assigned address contained within the packet, typically in a header. The end-to-end delay of packets, or the time it takes a packet to travel within the network from a first user or "sender" to a second user or "receiver" varies, depending upon channel conditions, network load, Quality of Service (QoS) capabilities of the system, and other flows competing for resources among other things.

Most wireless standards provide different mechanisms for Power save and QoS for embedded devices. The QoS requirements for power save embedded stations give precedence to higher priority data traffic over lower priority data traffic. The current implementation for QoS in most wireless technologies provides higher priority to particular traffic (e.g. Voice/Video) and lower priority to other kinds of traffic (e.g. Background traffic).

The QoS implementation in today's wireless technology implementations takes into account the needs of a higher priority data over lower priority data and adjusts the bandwidth for transmission between the various categories of QoS queues accordingly. That is, higher priority data gets more access to the wireless medium than lower priority data. However in extreme cases where in there is a high degree of higher priority data being transmitted by certain applications, lower priority data applications can suffer from starvation.

SUMMARY

Systems and methods are disclosed to communicate data between wireless access point with one or more low priority queues; one or more high priority queues; a quality of service (QoS) queue coupled to the low and high priority queues; a fairness counter; and a buffer coupled to the fairness counter and the QoS queue to map buffer mapping to the QoS queue when the fairness counter expires, the method including performing an association request for fairness scheduling; and injecting a low priority packet in a transmit opportunity of the high priority queue.

Implementations of the above aspect may include one or more of the following. The fairness counter is in the Wireless access point for lower priority data traffic. The fairness counter can be utilized to send a particular (a single) packet from the lower priority queue in the transmit opportunity for a higher access category queue. By allowing the transmission of a single packet from the lower priority queue in the transmit opportunity for higher priority data queue, the starvation of the lower priority application can be prevented. This will allow a lower priority application from not timing out and failing the lower priority operation. The counter value can be negotiated between the wireless station and the wireless Access point at the time of the wireless station joining the network. Also, the session timeouts can be configured for a particular independent session (e.g. TCP session can configure it for its session or a UDP session can configure it for its session time independently). The Wireless station can also determine to enable the feature after joining the network using a handshake mechanism. The decision/control of allocating a specific counter value based on the needs of a particular station/session will rest with the wireless access point. The decision making process is however triggered by the wireless client Advantages of the preferred system may include one or more of the following. The system provides a mechanism which would help in preventing starvation of lower priority applications during high multi-media operation, among others. A user normally, would be performing more than one operation which would involve normally a number of low-priority tasks (back-ground/best-effort tasks) and a single high requirement high priority work. For e.g. a person with a VOIP enabled smart-phone, might be downloading a movie, sending chat messages (lower priority), among others, and also gaming or watching a movie or might be on a call (high priority). In such scenarios, the system helps lower priority application in not timing out and not leading to data starvation for the lower data priority applications. Thus, overall throughput is enhanced.

DESCRIPTION

Figure 1:
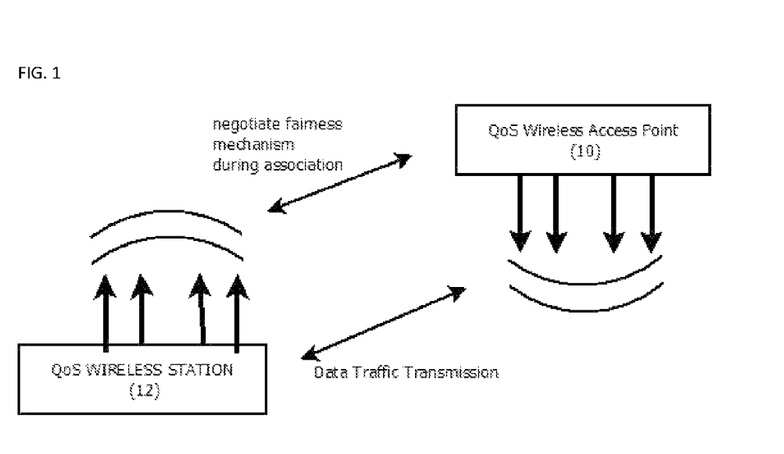
FIG. 1 shows an exemplary negotiation process for fairness-based scheduling.

FIG. 1 shows an exemplary negotiation process for fairness-based scheduling. In this system, a QoS wireless access point 10 communicates with a QoS wireless station 12. Data traffic is transmitted through the system. Additionally, fairness scheduling negotiation is also performed where the wireless station 12 negotiates with access point 10 to enable its fairness counter.

To address the problem of starvation of packets for the lower priority packets, the system of FIG. 1 provides a fairness counter in the wireless access point for lower priority data traffic.

Figure 2:
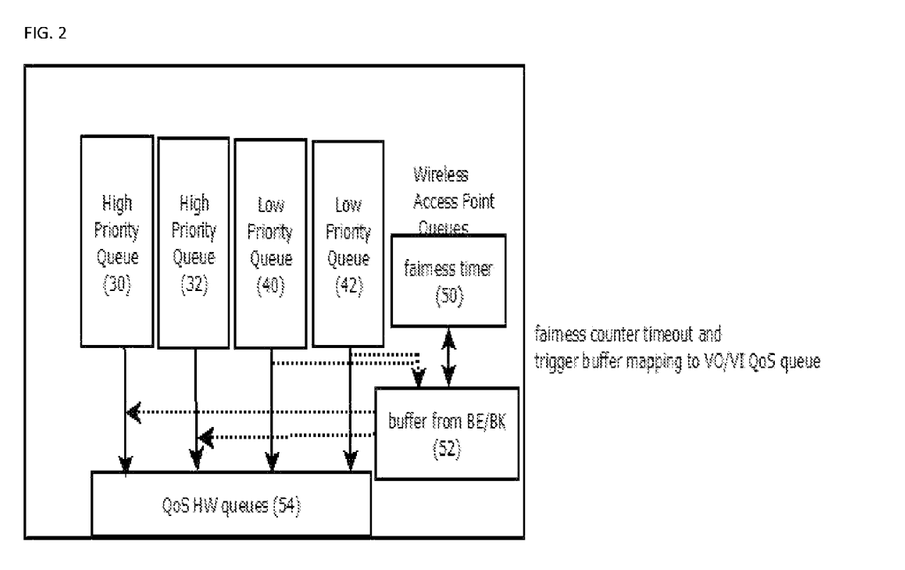
FIG. 2 shows an exemplary embodiment on an access point.

FIG. 2 shows an exemplary embodiment on an access point. The system includes high priority queue 30-32 and low priority queues 40-42, all of which communicate with QoS queues 54. Fairness timer 50 communicates with buffer 52 that interact with HW QoS queues 54. Fairness counter 50 is started and periodically times out and triggers a buffer mapping from buffer 52 (with buffer taken from the low-priority queues 40-42) to VO/VI QoS queues and mapped to QoS HW queues 54 for transmission during higher priority (VO/VI) transmit opportunity.

The fairness counter can be utilized to send a particular (a single) packet from the lower priority queue in the transmit opportunity for a higher access category queue. By allowing the transmission of a single packet from the lower priority queue in the transmit opportunity for higher priority data queue, the starvation of the lower priority application can be prevented. This will allow a lower priority application from not timing out and failing the lower priority operation. The counter value can be negotiated between the wireless station and the wireless Access point at the time of the wireless station joining the network. Also, the session timeouts can be configured for a particular independent session (e.g. TCP session can configure it for its session or a UDP session can configure it for its session time independently). The Wireless station can also determine to enable the feature after joining the network using a predetermined handshake mechanism. The decision/control of allocating a specific counter value based on the needs of a particular station/session will rest with the wireless access point. The decision making process is however triggered by the wireless client.

Figure 3:
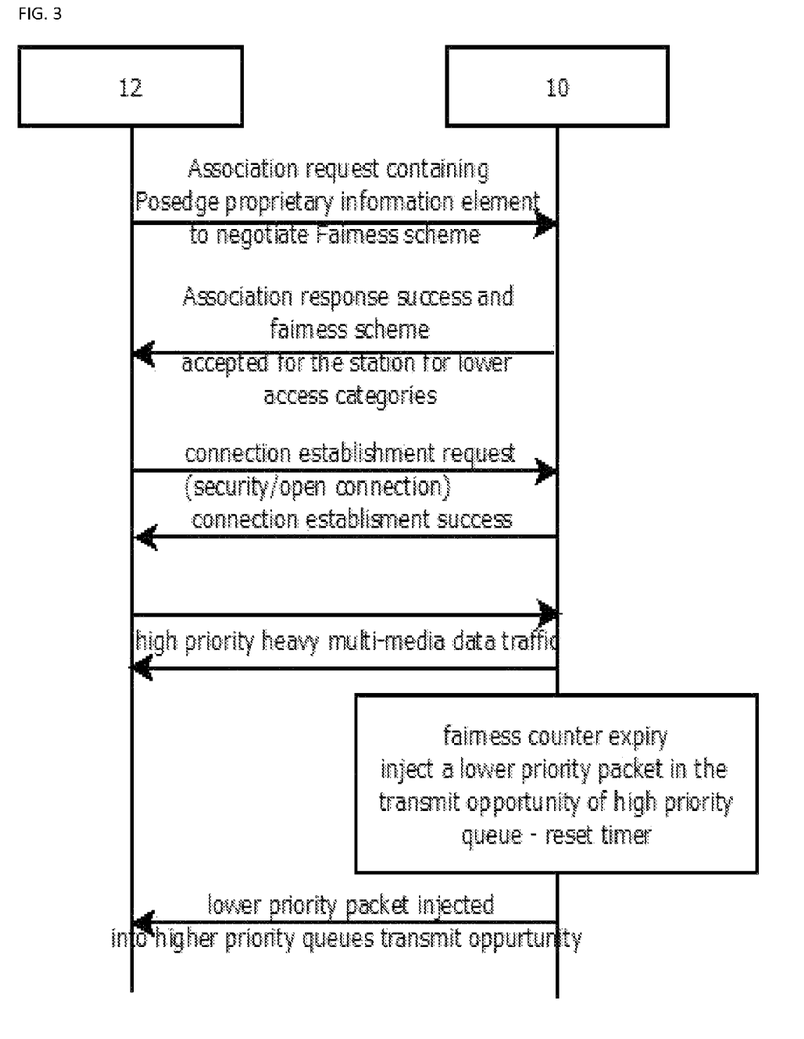
FIG. 3 shows an exemplary process to handle high priority multimedia traffic by the fairness-based scheduling system.

FIG. 3 shows an exemplary process to handle high priority multimedia traffic by the fairness-based scheduling system. Station 12 during association generates an association request containing information to negotiate a fairness scheduling scheme. Access point 10 in response replies that the association was successful via an association response and the fairness scheme has been accepted for the station or lower access categories. Station 12 and access point 10 then proceed for a security/open connection establishment and if connection establishment is successful, Station 12 and access point 10 then communicates high priority media intensive data such as voice or video. At a predetermined point, the fairness counter expires and injects a low priority packet in the transmit opportunity of a high priority queue. This enables one or more low priority applications to access the network and keeps the connection alive. The timer is then reset and high priority media data transmission resumes.

The fairness counter will be set in terms of time. It count down to zero and when the counter value reaches zero, a packet from the lower priority queue (based on an application/session which has requested for the fairness mechanism), will be inserted in the transmit opportunity for the higher priority queue.

The fairness counter value for a particular station/session/application might differ and the access point will be the master for setting the counter value for the particular fairness session. The trigger point to enable the fairness counter for a particular station will be triggered by the station. The value set for the fairness counter by the Access Point will be conveyed back to the wireless client during connection time or after connection using a predetermined protocol.

Figure 4A:
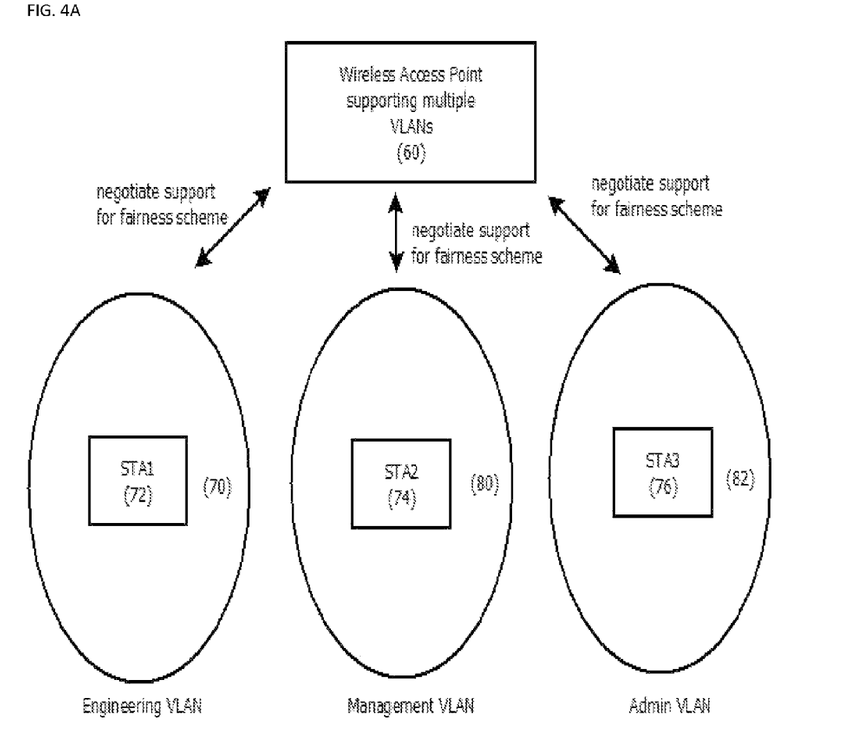
FIG. 4A shows an exemplary arrangement where stations belonging to multiple VLANs can negotiate to support fairness-based scheduling.

FIG. 4A shows an exemplary arrangement where stations belonging to multiple VLANs can negotiate to support fairness-based scheduling. In this system, access point 60 can support multiple VLANs 70, 80 and 82. Each VLAN in turn has STA 72, 74 and 76, respectively. The station (STA) is a device that has the capability to use the 802.11 protocol. For example, a station may be a laptop, a desktop PC, PDA, access point or Wi-Fi phone. A STA may be fixed, mobile or portable. Generally in wireless networking terminology, a station, wireless client and node are often used interchangeably, and no strict distinction existing between these terms. The station also can be designated as transmitter or receiver based on its transmission characteristics. The VLANs negotiate with access point 60 to support the fairness scheme.

Figure 4B:
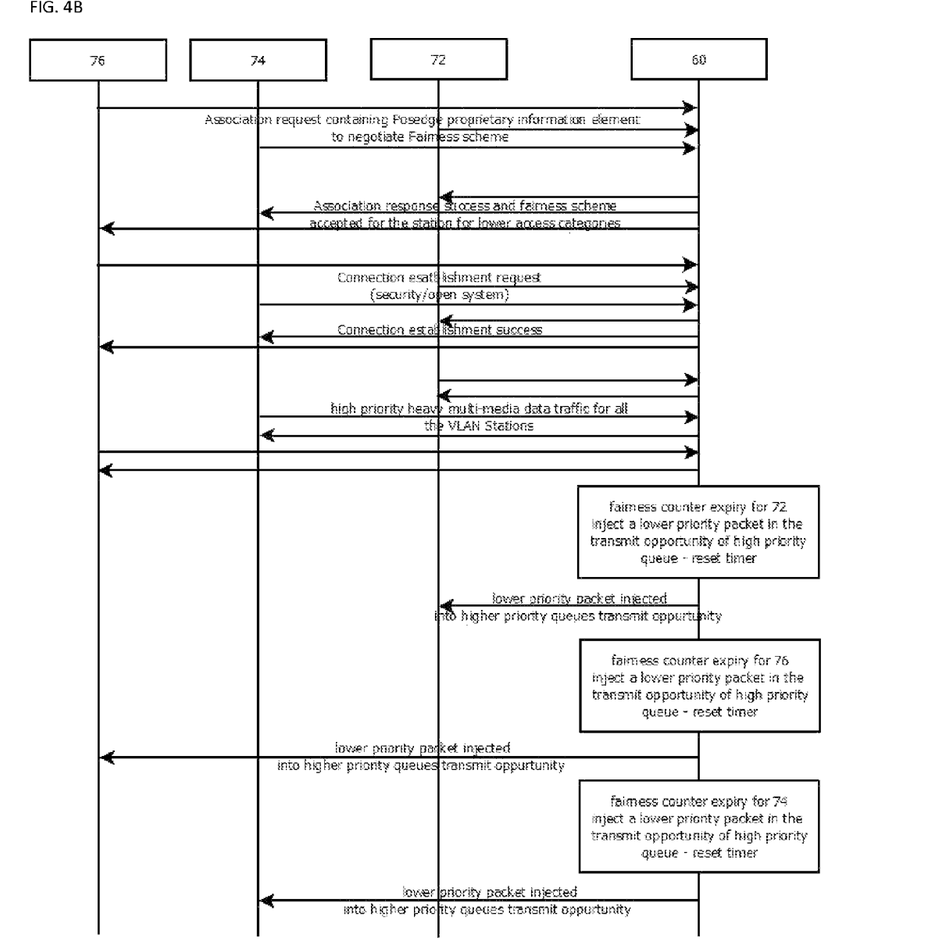
FIG. 4B shows exemplary multiple VLAN operations for the system of FIG. 4A.

FIG. 4B shows exemplary multiple VLAN operations for the system of FIG. 4A. In this example, VLANs 72-76, during association and connection establishment sends an association request to negotiate the fairness scheme with access point 60. In response, if accepted, access point 60 indicates association success and accepts the fairness scheme for the station or lower access categories. After a successful association, a connection establishment between the VLAN stations 72-76 is negotiated and on a successful connection establishment, high priority traffic such as voice or movie traffic is supported for all VLANs 72-76. At some point, the fairness counter for VLAN 72, for example, expires and injects a low priority packet in the transmit opportunity of a high priority queue. This enables one or more low priority applications to access the network and keeps the connection alive. The timer is then reset and high priority media data transmission resumes. Correspondingly, at one point, the fairness counter for VLAN 74, for example, expires and injects a low priority packet in the transmit opportunity of a high priority queue. This enables one or more low priority applications to access the network and keeps the connection alive. The timer is then reset and high priority media data transmission resumes. Similarly, the fairness counter for VLAN 76, for example, expires and injects a low priority packet in the transmit opportunity of a high priority queue. This enables one or more low priority applications to access the network and keeps the connection alive. The timer is then reset and high priority media data transmission resumes.

Figure 5:
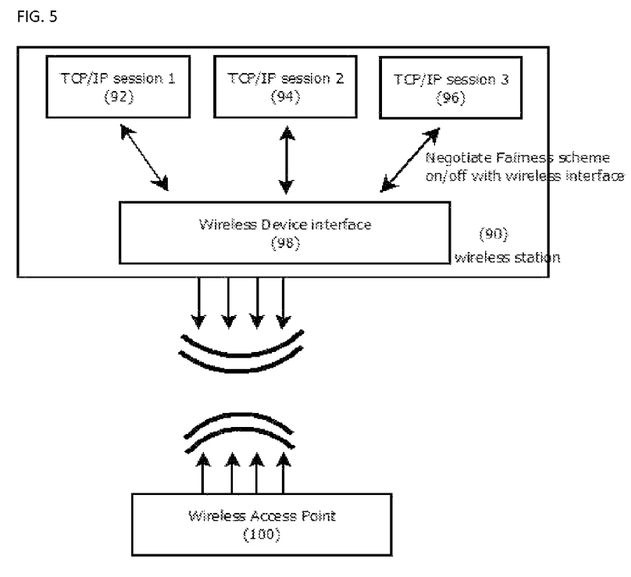
FIG. 5 shows an exemplary system where multiple TCP/IP sessions can register for the fairness-based scheduling.

FIG. 5 shows an exemplary system where multiple TCP/IP sessions can register for the fairness-based scheduling. In this embodiment, wireless station 90 includes a plurality of TCP/IP sessions 92-96, each communicating with wireless device interface 98. Wireless station 90 communicates with access point 100.

Figure 6:
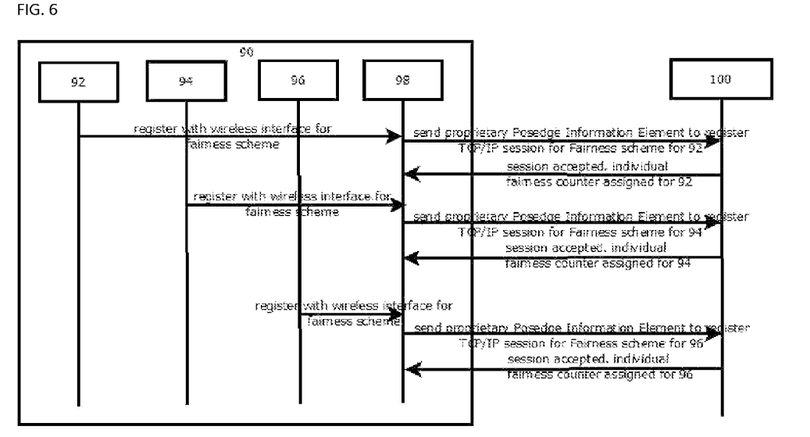
FIG. 6 shows exemplary multiple TCP/IP sessions for the system of FIG. 5.
Figure 7:
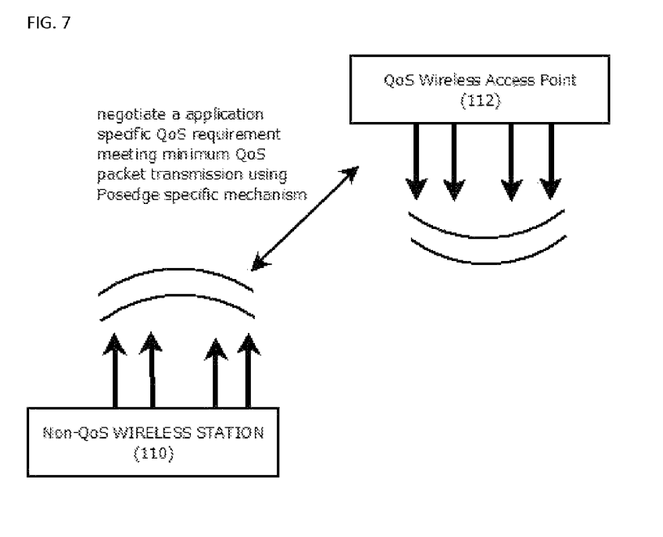
FIG. 7 shows an exemplary system where non-QoS stations can request a minimum time duration.

FIG. 6 shows exemplary multiple TCP/IP sessions for the system of FIG. 5. Sessions 92-96 register with wireless interface 98 for the fairness scheme. Interface 98 sends a request using a pre-determined protocol to register a particular TCP/IP session 92-96. In response, if accepted, access point 100 assigns a fairness counter to each of sessions 92-96. In this manner, QoS independent applications can request a particular packet belonging to a particular lower priority queue to be buffer enabled. In a WLAN wireless station only working on PS-POLL might still request a particular user lower-priority packet to be sent to it after every "n" interval time period FIG. 7 shows an exemplary system where non-QoS stations can request a minimum time duration. In this embodiment, non-QoS wireless station 110 negotiates application specific QoS requirement meeting minimum QoS packet transmission using a predetermined protocol with QoS wireless access point 112.

Figure 8:
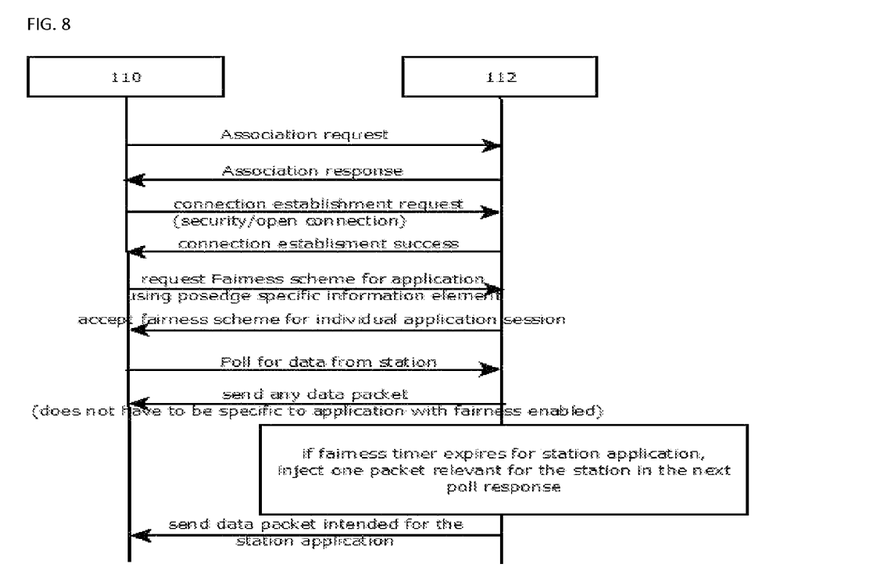
FIG. 8 shows an exemplary line diagram for the system of FIG. 7.

FIG. 8 shows an exemplary line diagram for the system of FIG. 7. First, station 110 sends an association request to access point 112. In response, if accepted, access point 112 indicates that the association was successful. A connection establishment procedure ensues and access point 112 indicates that the connection establishment was successful. In turn, station 110 requests the fairness scheme for the application using a predetermined protocol. Access point 112 accepts the fairness scheme for a particular application session. Station 110 then polls for data from station 112, and access point 112 sends data packets to station 110. If the fairness timer expires for the station application, access point 112 injects one packet for the station in the next poll response for the negotiated QoS queue for the application.

Figure 9:
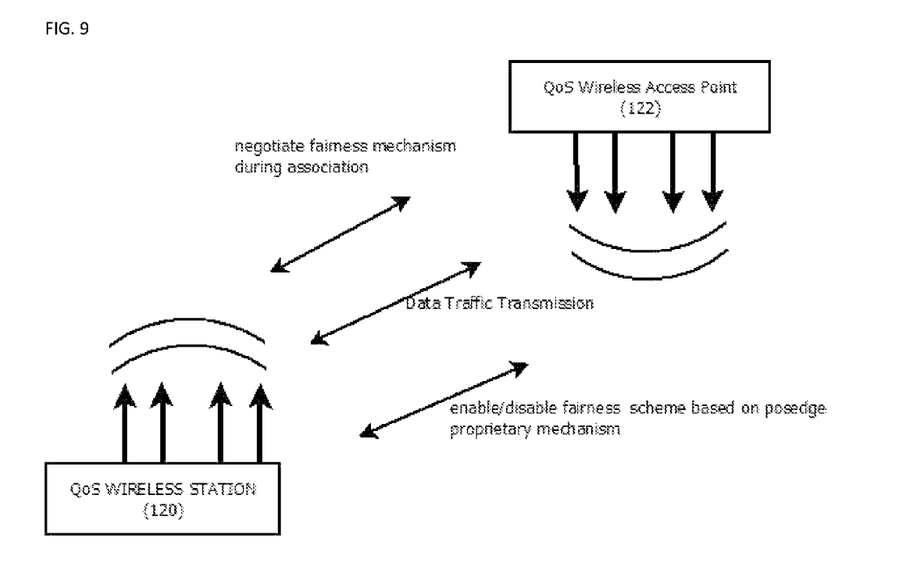
FIG. 9 shows an exemplary system where a station negotiates fairness for a particular application.

FIG. 9 shows an exemplary system where a station negotiates fairness for a particular application. QoS wireless access point 122 can negotiate fairness mechanism during association with QoS wireless station 120. The system can dynamically disable/enable the fairness feature even after association via a pre-agreed mechanism (e.g. action frame in 802.11). A lower priority application can then trigger this mechanism on; when it sees that it might time out and disables it if it feels that there is no requirement for the same. Lastly, data transmission between access point 122 and station 120 can occur as usual.

Figure 10:
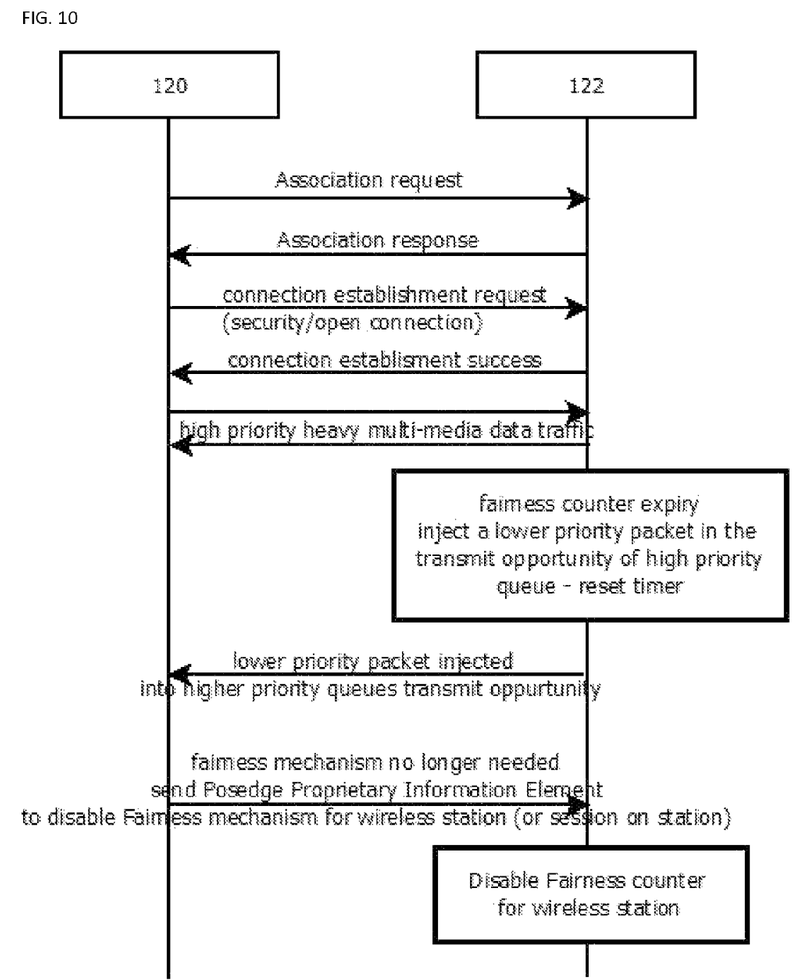
FIG. 10 shows an exemplary line diagram where a wireless station disables the fairness feature.

FIG. 10 shows an exemplary line diagram where a wireless station disables the fairness feature if traffic does not warrant the fairness scheme. Station 120 during association sends an association request containing information to negotiate fairness scheme with access point 122. In return, access point 122 responds with association success and fairness scheme acceptance for the station or for lower access categories. Connection establishment ensue between station 120 and connection request is accepted by access point 122. Then high priority media data traffic is communicated over the network. At some point, the fairness counter expires and access point 122 injects a low priority packet in the transmit opportunity high priority queue. The timer is then reset. Station 120 then sends a request to disable the fairness scheme for the wireless station (or session on the station) to access point 122. In turn, access point 122 disables the fairness counter for wireless station 120.

Figure 11:
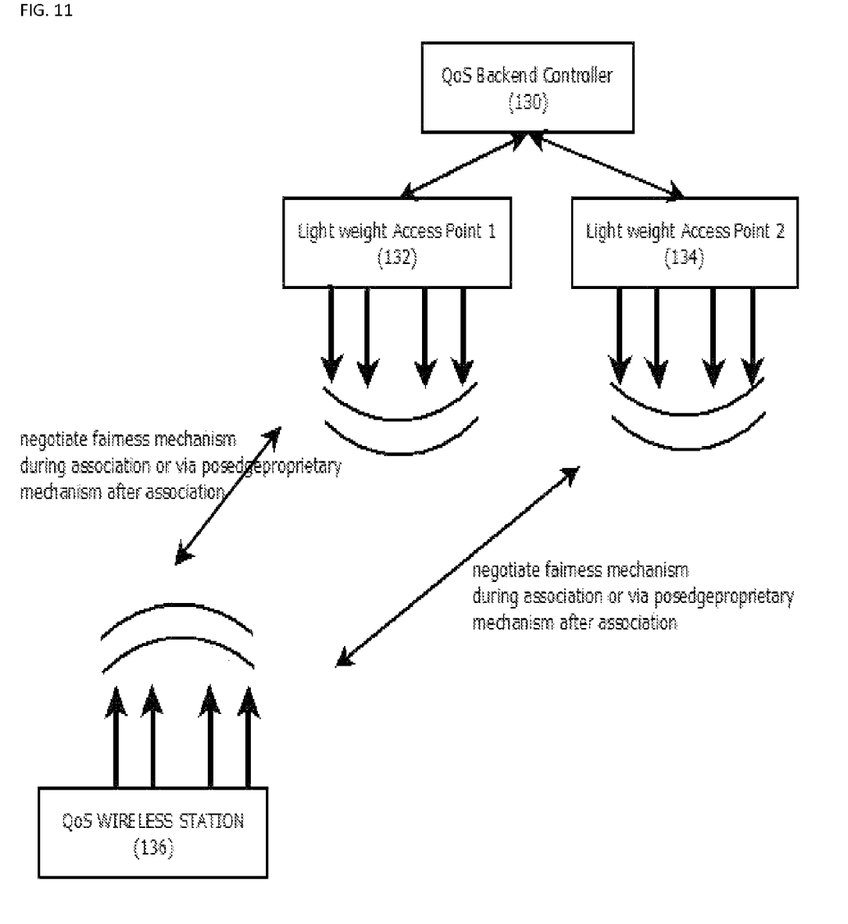
FIG. 11 shows an exemplary system with a wireless station negotiating for fairness using light weight AP set up.

Light weight wireless APs connected to a controller as master will also conform to the above method, wherein the controller negotiates the parameters for fairness. FIG. 11 shows an exemplary system with a wireless station negotiating for fairness using light weight AP set up. In this embodiment, QoS backend controller 130 communicates with light weight access points 132-134. Access points 132-134 in turn communicates with QoS wireless station 136 to negotiate fairness scheme between station 136 and each access point 132-134.

Figure 12:
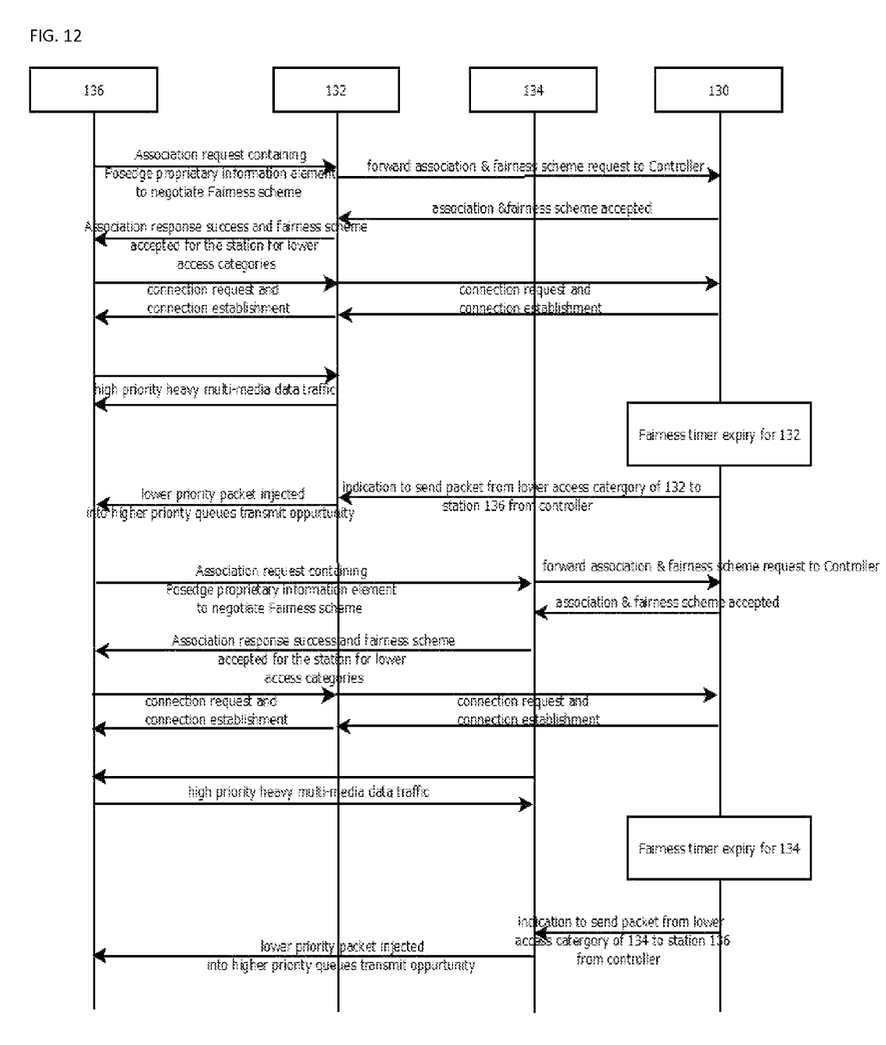
FIG. 12 shows an exemplary implementation of fairness handling for a controller.

FIG. 12 shows an exemplary implementation of fairness handling for a controller. In this example, station 136 during association sends an association request to negotiate the fairness scheme with access point 132, which in turn forwards the fairness scheme request to controller 130. Controller 130 in turn accepts the fairness scheme request, and such acceptance is forwarded to access point 132 to send to station 136. Also, the controller 130 negotiates a connection request/response via access point 132 with the station 136. Media intensive data flows between the station 136 and access point 132. Eventually, the fairness timer expires for access point 132, causing controller 130 to indicate a packet transmission from a lower access category of access point 132. The low priority packet is injected into high priority queues transmit opportunity of station 136. When the station 136 connects to controller 130 via access point 134, station 136 sends an association request containing fairness mechanism information to negotiate the fairness scheme with access point 134, which in turn forwards the fairness scheme request to controller 130. Controller 130 in turn accepts the fairness scheme request, and such acceptance is forwarded to access point 134 to send to station 136. media intensive data transmission occurs between station 136 and access point 134. The fairness timer expires for access point 134, causing controller 130 to indicate a packet transmission from a lower access category of access point 134. The low priority packet is injected into high priority queues transmit opportunity of station 136.

Figure 13:
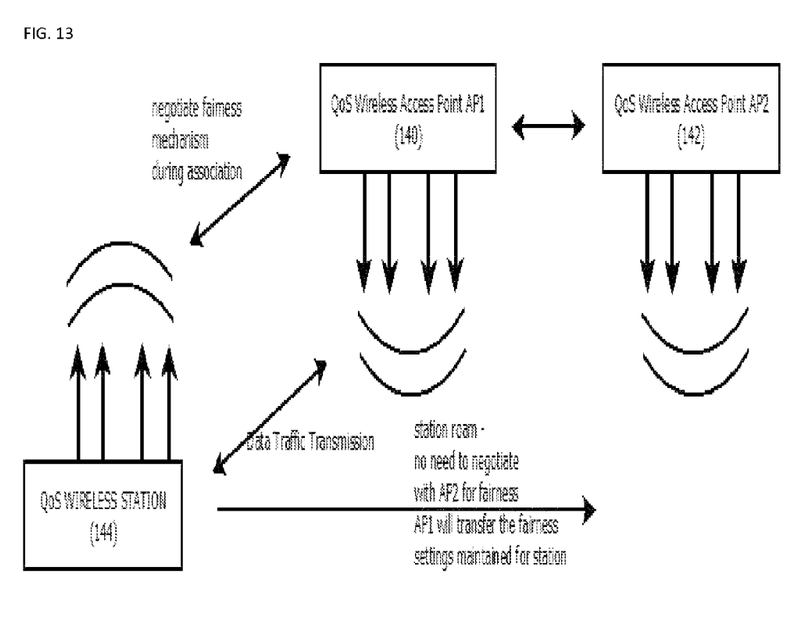
FIG. 13 shows an exemplary system with multiple access points sharing the fairness scheduling.

FIG. 13 shows an exemplary system with multiple access points sharing the fairness scheduling. In this embodiment, multiple wireless access points 140-142 can share the information with each other of the fairness mechanism, which was negotiated by the wireless station 144 with a particular access point 140 or 142 during association. This feature enables seamless handover of the fairness mechanism settings from one access point to another access point during station roam.

Figure 14:
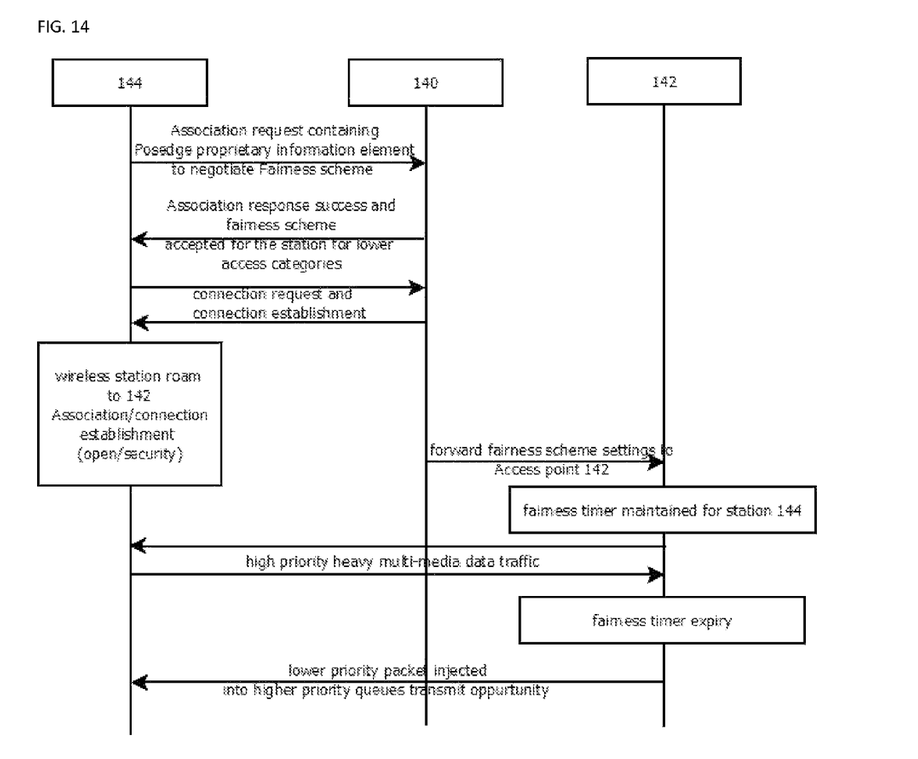
FIG. 14 shows an exemplary line diagram of an inter-access point negotiation for fairness scheduling.

FIG. 14 shows an exemplary line diagram of an inter-access point negotiation for fairness scheduling. In this example, station 144 during association sends an association request containing information on fairness mechanism to negotiate the fairness scheme to access point 140. In turn access point 140 replies with an association success indication and acceptance of the fairness scheme for station 144 or lower access categories. Meanwhile, wireless station 144 roams to an area served by access point 142. In this case, access point 140 forwards fairness scheme settings to access point 142. The fairness timer is maintained for station 144.

Eventually the fairness timer expires and a low priority packet is injected into station 144's high priority queues transmit opportunity.

The system provides a mechanism which would help in preventing starvation of lower priority applications during high multi-media operation, among others. A user normally, would be performing more than one operation which would involve normally a number of low-priority tasks (background/best-effort tasks) and a single high requirement high priority work. For e.g. a person with a VOIP enabled smartphone, might be downloading a movie, sending chat messages (lower priority), among others, and also gaming or watching a movie or might be on a call (high priority). In such scenarios, the system helps lower priority application in not timing out and not leading to data starvation for the lower data priority applications. Thus, overall throughput is enhanced.

For clarity the following discussion describes a spread-spectrum communication systems supporting packet data communications including, but is not limited to Code Division-Multiple Access (CDMA) systems, Orthogonal Frequency Division Multiple Access (OFDMA), Wideband Code Division Multiple Access (W-CDMA), Global Systems for Mobile Communications (GSM) systems, systems supporting IEEE standards, such as 802.11 (A,B,G), 802.16, etc.

The previous description is provided to enable any person skilled in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

While the specification describes particular examples of the present invention, those of ordinary skill can devise variations of the present invention without departing from the inventive concept. For example, the teachings herein refer to circuit-switched network elements but are equally applicable to packet-switched domain network elements. Also, the teachings herein are not limited to authentication triplet pairs but can also be applied to use of a single triplet including two SRES values (one of the customary format and one of the newer format disclosed herein).

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method to communicate data between a wireless access point and a wireless station comprising:
    maintaining one or more low priority Quality of Service (QoS) queues for tracking low-priority data to be transmitted between the wireless access point and the wireless station;
    maintaining one or more high priority QoS queues, each of the high priority queues for tracking high-priority data to be transmitted between the wireless access point and the wireless station;
    performing a fairness mechanism negotiation, during association and connection establishment or via pre-determined protocol, comprising requesting fairness treatment and providing, by the access point responsive to the requesting, a value for a fairness counter initialized based on an expected timeout period for a type of traffic tracked by the low priority queue associated with the fairness counter;
    periodically updating the fairness counter;
    determining when the fairness counter expires according to the periodic updating;
    transmitting data tracked by the high priority queue according to a QoS scheme; and
    injecting, responsive to the expiration of the fairness counter, a low priority packet, from a low priority queue associated with the fairness counter, in a transmit opportunity of the high priority queue in substitution for data tracked by the high priority queue that otherwise would have been transmitted according to the QoS scheme.

2. The method of claim 1, further comprising associating at least one of the low priority queues with a Transport Control Protocol (TCP) or User Datagram Protocol (UDP) session.

3. The method of claim 1, wherein the fairness counter is provided in the wireless access point.

4. The method of claim 1, wherein the expected timeout period used to initialize the fairness counter is based on a timeout period for one of TCP and UDP traffic.

5. The method of claim 2, further comprising performing the fairness mechanism negotiation, periodically updating the fairness counter, determining a time when the fairness counter expires according to the periodic updating, and transmitting data tracked by the high priority queue according to a QoS scheme for each of a plurality of communication sessions.

6. The method of claim 1, wherein the injecting, responsive to the expiration of the fairness counter, a low priority packet, from a low priority queue associated with the fairness counter, in a transmit opportunity of the high priority queue in substitution for data tracked by the high priority queue that otherwise would have been transmitted according to the QoS scheme is performed by the wireless access point, and further comprising receiving the low priority packet at the wireless station and providing the low priority packet to a communication session associated with that low priority packet.

7. The method of claim 1, further comprising configuring a respective separate fairness counter for each of a plurality of independent sessions, updating each respective fairness counter and responsive to expiration of any of the respective separate fairness counters, injecting a low priority packet, for the session corresponding to the fairness counter that expired in a transmit opportunity of the high priority queue in substitution for data tracked by the high priority queue that otherwise have been transmitted according to the QoS scheme.

8. The method of claim 1, comprising configuring fairness counters for both a TCP session and a UDP session independently.

9. The method of claim 1, comprising requesting usage of a fairness scheme by the wireless station of the wireless access point for each of a plurality of sessions.

10. The method of claim 1, comprising allocating a specific fairness counter value based on predetermined needs of a particular station or session.

11. The method of claim 1, comprising indicating by the wireless station to the wireless access point that the fairness mechanism is no longer required for a particular communication session and responsively ceasing to maintain a fairness counter for that communication session.

12. The method of claim 1, wherein the wireless station belongs to multiple VLANs and further comprising negotiating per VLAN fairness counters for each of the multiple VLANs.

13. The method of claim 1, further comprising registering for separately tracked fairness based scheduling for each of multiple TCP/IP sessions.

14. The method of claim 1, wherein non-QoS stations can request a minimum time duration.

15. The method of claim 1, further comprising requesting, from the wireless station to the wireless access point, fairness scheduling for a particular application operating in the station.

16. The method of claim 15, further comprising disabling the fairness scheduling for the particular application.

17. The method of claim 1, further comprising receiving, by a lightweight access point, a request for fairness scheduling, providing the received request, by the lightweight access point to a controller, and determining an initial fairness counter value by the controller.

18. The method of claim 1, further comprising sharing fairness scheduling information negotiated by one wireless access point, with another wireless access point to which the wireless station is roaming.

19. The method of claim 1, further comprising performing inter-access point negotiation for fairness scheduling.

20. A wireless access point system, comprising:
a memory configured to store one or more low quality of service (QoS) priority queues, one or more high QoS priority queues
a fairness counter configured to be initialized to a value, periodically updated and upon expiration, to trigger an indication, wherein the value to which the fairness counter is initialized is determined based on an expected timeout period for a type of data traffic to be transmitted in a communication session to which the fairness counter will be associated; and
a buffer coupled to the fairness counter to receive the indication, the one or more low priority queues, and the one or more high priority queues and configured to obtain a packet from a low priority queue to which the fairness counter is associated and to map a packet in that low priority queue to a QoS hardware queue associated with a high priority queue, in response to the indication and to reset the fairness counter to the initial value, wherein the wireless access point is configured to receive a request for fairness tracking from a wireless station, and to respond by determining the value to which the fairness counter will be initialized.

21. The system of claim 20, comprising a wireless station wirelessly coupled to the wireless access point the wireless station comprising a wireless interface configured to request, on behalf of an application executing in the wireless station, a request for fairness tracking, and to then make the request received by the wireless access point.

\* \* \* \* \*

UNITED STATES PATENT AND TRADEMARK OFFICE
CERTIFICATE OF CORRECTION

| | |
|---|---|
| PATENT NO. | : 8,982,901 B2 |
| APPLICATION NO. | : 13/555151 |
| DATED | : March 17, 2015 |
| INVENTOR(S) | : Uppunda et al. |

It is certified that error appears in the above-identified patent and that said Letters Patent is hereby corrected as shown below:

On the title page item (73),

Delete the Assignee "Imagination Technologies, Limited, Kings Langley, Herfordshire (GB)"

and replace with -- IMAGINATION TECHNOLOGIES, LLC
3201 SCOTT BLVD
SANTA CLARA, CALIFORNIA 95054 --

Signed and Sealed this
First Day of March, 2016

Michelle K. Lee
*Director of the United States Patent and Trademark Office*